United States Patent
Hamchaoui et al.

(10) Patent No.: US 10,230,663 B2
(45) Date of Patent: Mar. 12, 2019

(54) TECHNIQUE FOR PROCESSING A DATA STREAM BETWEEN A SERVER AND A CLIENT ENTITY

(71) Applicant: Orange, Paris (FR)

(72) Inventors: Isabelle Hamchaoui, Tregastel (FR); Sebastien Jobert, San Jose, CA (US); Yann Adam, Plouguiel (FR)

(73) Assignee: ORANGE, Paris (FR)

( * ) Notice: Subject to any disclaimer, the term of this patent is extended or adjusted under 35 U.S.C. 154(b) by 262 days.

(21) Appl. No.: 14/379,200

(22) PCT Filed: Feb. 12, 2013

(86) PCT No.: PCT/FR2013/050285
§ 371 (c)(1),
(2) Date: Aug. 15, 2014

(87) PCT Pub. No.: WO2013/121141
PCT Pub. Date: Aug. 22, 2013

(65) Prior Publication Data
US 2015/0012618 A1 Jan. 8, 2015

(30) Foreign Application Priority Data
Feb. 16, 2012 (FR) ...................... 12 51413

(51) Int. Cl.
*H04L 12/927* (2013.01)
*H04L 29/06* (2006.01)
(Continued)

(52) U.S. Cl.
CPC .......... *H04L 47/805* (2013.01); *H04L 47/826* (2013.01); *H04L 65/1066* (2013.01); *H04L 47/10* (2013.01); *H04L 47/12* (2013.01)

(58) Field of Classification Search
CPC ......... H04L 43/16; H04L 47/10; H04L 47/12; H04L 47/11; H04L 47/30; H04L 47/26;
(Continued)

(56) References Cited

U.S. PATENT DOCUMENTS 7,830,801 B2 * 11/2010 Kwan ..................... H04L 47/10
370/230
7,859,996 B2 * 12/2010 Kwan ..................... H04L 47/10
370/229
(Continued)

FOREIGN PATENT DOCUMENTS

EP 1873977 A1 1/2008
WO 20091055248 A1 4/2009
(Continued)

OTHER PUBLICATIONS

Machine translation of WO2011001096.*
(Continued)

*Primary Examiner* — Philip J Chea
*Assistant Examiner* — Ruth Solomon
(74) *Attorney, Agent, or Firm* — David D. Brush; Westman, Champlin & Koehler, P.A.

(57) ABSTRACT

A technique is provided for processing a data stream between a server and a client entity in a packet communication network. The data stream is composed of packets steered by a processing device. Upon the receipt of a first packet of the data stream, the processing device implements a phase of observing this data stream, in the course of which the packets of the data stream which are exchanged between the server and the client entity and which follow the first packet are transmitted. On detection of congestion associated with the data stream, the data stream is then rejected and the processing device does not transmit packets of the data stream which are exchanged between the server and the (Continued)

client entity and are received after detection of the congestion.

9 Claims, 3 Drawing Sheets

(51) Int. Cl.
*H04L 12/911* (2013.01)
*H04L 12/801* (2013.01)

(58) Field of Classification Search
CPC ... H04L 47/266; H04L 47/805; H04L 47/826; H04L 4165/1066
USPC ........ 709/235, 224, 231, 232, 219; 370/229, 370/235, 231, 230
See application file for complete search history.

(56) References Cited

U.S. PATENT DOCUMENTS

| | | | | |
|---|---|---|---|---|
| 8,588,063 | B2* | 11/2013 | Van Leekwijck | H04L 47/10 370/229 |
| 9,143,457 | B2* | 9/2015 | Leung | H04L 47/12 |
| 2005/0047340 | A1* | 3/2005 | Babiarz | H04L 29/06027 370/231 |
| 2006/0092836 | A1* | 5/2006 | Kwan | H04L 47/10 370/229 |
| 2006/0092840 | A1* | 5/2006 | Kwan | H04L 47/10 370/230.1 |
| 2008/0175146 | A1* | 7/2008 | Van Leekwuck | H04L 47/10 370/230 |
| 2009/0109891 | A1* | 4/2009 | Fonseca, Jr. | H04L 12/5695 370/315 |
| 2010/0177634 | A1* | 7/2010 | Kiss | H04L 47/27 370/230 |
| 2011/0019549 | A1* | 1/2011 | Strulo | H04L 45/123 370/232 |
| 2011/0026399 | A1* | 2/2011 | Strulo | H04L 45/02 370/230 |
| 2011/0058477 | A1* | 3/2011 | Kwan | H04L 47/10 370/235 |
| 2011/0085444 | A1* | 4/2011 | Ko | H04L 43/026 370/236 |
| 2011/0202622 | A1* | 8/2011 | Cadiou | H04L 41/0806 709/206 |
| 2012/0087244 | A1* | 4/2012 | Leung | H04L 47/12 370/236 |
| 2012/0087245 | A1* | 4/2012 | Leung | H04L 47/12 370/236 |
| 2012/0155275 | A1* | 6/2012 | Massoulie | H04L 45/64 370/236 |
| 2014/0050095 | A1* | 2/2014 | Szilagyi | H04L 1/0002 370/236 |

FOREIGN PATENT DOCUMENTS

| | | | | |
|---|---|---|---|---|
| WO | 2010/046598 A2 | 4/2010 | | |
| WO | 20111001096 A1 | 1/2011 | | |
| WO | WO 2011001096 A1 * | 1/2011 | ............. | H04L 12/26 |

OTHER PUBLICATIONS

Machine translation of WO 2011001096 A1.*
English translation of the Written Opinion of the International Searching Authority dated Aug. 16, 2014 for corresponding International Application No. PCT/FR2013/050285, filed Dec. 2, 2013.
International Search Report and Written Opinion dated Apr. 24, 2013 for corresponding International Patent Application No. PCT/FR2013/050285, filed Feb. 12, 2013.
French Search Report and Written Opinion dated May 29, 2012 for corresponding French Patent Application No. 1251413, filed Feb. 16, 2012.

* cited by examiner

| Id F | State | $t_p$ | CN |
|------|-------|-------|----|
| F1 | Acc | 10 | |
| F2 | Obs | 0 | 3 |
| F3 | Acc | 0 | |
| F4 | Ref | 15 | |

US 10,230,663 B2

TECHNIQUE FOR PROCESSING A DATA STREAM BETWEEN A SERVER AND A CLIENT ENTITY

CROSS-REFERENCE TO RELATED APPLICATIONS

This Application is a Section 371 National Stage Application of International Application No. PCT/FR2013/050285, filed Feb. 12, 2013, the content of which is incorporated herein by reference in its entirety, and published as WO 2013/121141 on Aug. 22, 2014, not in English.

FIELD OF THE DISCLOSURE

The invention relates to a technique for processing a data stream between a server and a client entity. More precisely, this processing technique makes it possible to implement a function of admission control of a data stream in a packet communication network.

BACKGROUND OF THE DISCLOSURE

An admission control function can be implemented when establishing or opening a service session. A service session allows a data server to provide a client entity with data that may represent a digital content for example sounds or images. The service session may be accepted or rejected.

This admission control function makes it possible to protect the quality of service of the transmission of the data of already established sessions by rejecting, if necessary, new sessions.

Thus, the admission control function must ensure, for any new request for session opening on the part of a client entity, that the resources necessary for this new session are available in the network in order to accept the request in a time acceptable to the user of the client entity. This time depends on the service concerned.

This admission control function is relatively simple to implement in communication networks operating in connected mode by virtue of an exchange of signaling preceding any session opening and making it possible to verify whether the necessary resources are available and to reserve them. This admission control function is termed explicit, since the signaling request clearly indicates the amount of resources to be reserved, for example, the bitrate. However, an under-usage of resources is noted for networks of this type.

So-called implicit admission control functions also exist, which do not require a signaling exchange indicating the amount of resources to be reserved.

For this purpose, the patent application published under the number WO2011/001096 proposes a technique for controlling the opening of communications sessions between a server and client terminals linked by a packet communication network, in which, on receipt of a congestion information item regarding a first communication session established between a first client terminal and the server, a control device inhibits the opening of a second communication session with a second client terminal. A congestion information item indicates the existence of congestion. This entails for example the presence of the information item CE "Congestion Experienced" conveyed by the ECN field of the header of an IP packet.

Provision is thus made to detect the presence of an information field optionally containing a congestion information item relating to congestion affecting the first session and as a function of the value of the detected information field, to control (that is to say accept or refuse) the opening of the second communication session with the second client terminal. However, this procedure only makes it possible not to amplify an already identified congestion phenomenon by not admitting any new service sessions. It does not make it possible to obtain all the effects of an explicit admission control, such as the guarantee for the service sessions admitted of a quality of service in accordance with that required.

SUMMARY

One of the aims of the invention is to remedy inadequacies/drawbacks of the prior art and/or to afford improvements thereto.

According to a first aspect, the subject of the invention is a method for processing a data stream between a server and a client entity in a packet communication network. The data stream is composed of packets steered by a processing device. The method comprises the following phases implemented by the processing device:

a phase of observing said data stream, triggered on receipt of a first packet of the stream, in the course of which the packets of said data stream which are exchanged between the server and the client entity and which follow the first packet are transmitted;

a phase of rejecting said data stream, triggered on detection, on the basis of at least one data packet of said data stream, of congestion associated with said data stream, in the course of which packets of the data stream which are exchanged between the server and the client entity and are received after detection of the congestion are not transmitted.

Thus, in the first so-called observation phase, each packet of this data stream under observation is transmitted. Subsequent to the temporary admission of this new stream on the network, congestion may occur at the level of an apparatus contributing to the steering of the packets. The congestion is thus caused by the temporary admission of the data stream and is liable to disturb the transmission of other, already admitted, data streams. In this case, through the implementation of the processing method, the data stream under observation is then refused or rejected. The decision to reject the data stream is then taken as a function of the effective and noted impact of the admission of the data stream into the packet communication network. Thus, the quality of service of the already admitted data streams is liable to be disturbed only temporarily during the phase of observing the new data stream. It is recalled here that for the procedures known from the prior art, in the absence of prior congestion, the new data stream is admitted and its admission is liable to cause congestion affecting it and also a plurality of already admitted data streams.

It is stressed here that during the observation phase corresponding to the temporary admission of the data stream, packets transmitted by the server will be received by the client entity. In case of rejection of this stream by the processing device on completion of the observation period, this data stream is interrupted. However, there is no deterioration of the sensation of the user of the client entity with respect to the situation where the data stream is admitted and thereafter degraded as a function of poor operating conditions. For a digital content distribution service, it is also commonplace for a queue or buffer memory of the client entity to store packets before playback, corresponding for example to a playback duration of a few seconds. For such a service, when the maximum duration of the observation phase is chosen in a manner consistent with an average duration of these queues, playback of the digital content will not begin and thus the user will not be able to detect that the data stream has been temporarily admitted. It is stressed here that the maximum duration of the observation phase can be defined in time units or else as a number of packets transmitted in this observation phase.

The various embodiments or characteristics of implementation mentioned hereinafter can be added independently or in combination with one another, to the steps of the above-defined processing method.

According to a particular characteristic, in the absence of detection of congestion associated with said data stream during the observation phase, the data stream is accepted.

According to a particular characteristic, the congestion associated with said data stream is detected by receipt of at least one congestion information item transported in one of the packets of the data stream that are received in the observation phase.

An existing congestion identification technique, such as the marking of the ECN field in the header of the IP packets, is used for example within this framework.

An existing function of the packet communication network is thus used, thereby making it possible to profit from the advantages presented hereinabove in a simple manner and within the framework of existing systems.

According to another particular characteristic, at least one other data stream being steered by the processing device, the rejection phase is also triggered on detection in the course of the observation phase of congestion associated with said other data stream.

The information relating to the congestion of the other data stream thus supplements the observation of the effects of a temporary admission of the data stream.

According to yet another particular characteristic, the congestion information item is carried by a packet received from the server and destined for the client entity.

The congestion information item is for example a congestion information item regarding the transmission of the packets upstream of the server.

According to yet another particular characteristic, the congestion information item is carried by an acknowledgment packet sent by the client entity destined for the server.

The congestion information item is for example a congestion information item regarding the transmission of the packets from the server to the client entity, which is received and re-sent by the client entity in the reverse direction and consequently received by the server from the client entity. It thus entails a congestion information item regarding the transmission of the packets downstream of the server.

The congestion information item can be contained in a header of a data packet received from the client entity by the server, for example in a response message sent by the client entity to the server, such as an acknowledgment of receipt or a communication report originating from the client entity in response to the data delivered to the client entity by the server.

According to yet another particular characteristic, the observation phase is implemented for data streams of service class lower than a predetermined value.

It is thus possible to implement the processing method solely on data streams of low priority, while routinely admitting the data streams of higher priority.

According to a second aspect, the invention relates furthermore to a device for processing a data stream between a server and a client entity in a packet communication network, the data stream being composed of packets, comprising:

transmission means, designed to transmit a packet of a data stream received;

means for detecting congestion, designed to detect, on the basis of at least one data packet of a data stream, congestion associated with said data stream;

identification means, designed to detect a first packet of a data stream and to trigger the means for detecting congestion;

control means, designed to inhibit the transmission of the subsequent packets of said data stream by the transmission means, on detection of congestion associated with said data stream by the means for detecting congestion.

According to a third aspect, the invention also relates to a node apparatus in a packet communication network, designed to steer packets exchanged between a server and a client entity, and furthermore comprising a processing device according to the second aspect.

According to a fourth aspect, the invention relates to a program for a processing device, comprising program code instructions intended to control the execution of the steps of the above-described method, when said program is executed by said device and a recording medium readable by a processing device on which a program for a device is recorded.

BRIEF DESCRIPTION OF THE DRAWINGS

Other characteristics and advantages of the invention will be more clearly apparent on reading the following description of a particular embodiment of the invention, given with reference to the appended drawings in which.

DETAILED DESCRIPTION OF ILLUSTRATIVE EMBODIMENTS

Figure 1:
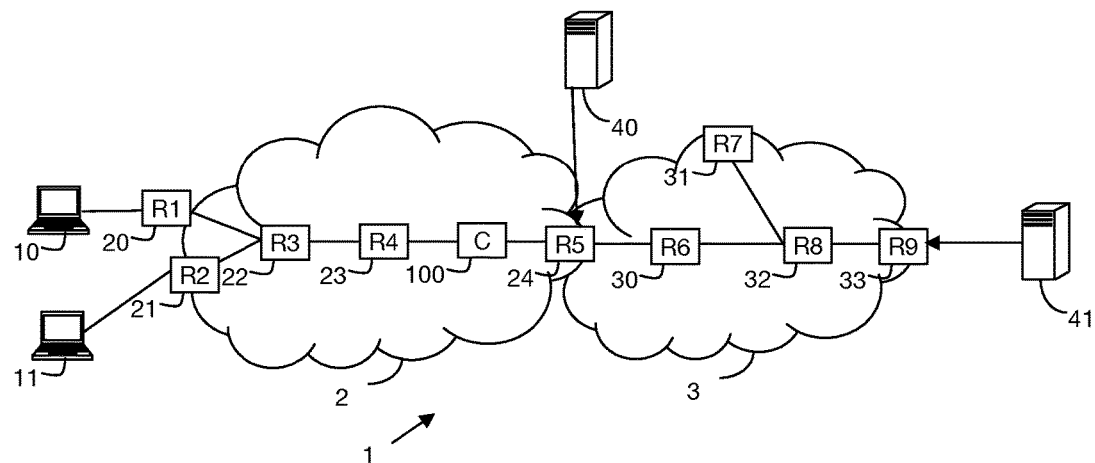
FIG. 1 represents a processing device in its environment.

FIG. 1 represents a processing device 100 in a packet communication network 1.

The packet communication network 1 allows client entities 10, 11 to exchange data streams with servers 40, 41 by way of various communication sub-networks 2, 3. By way of illustrative example, these servers 40, 41 are servers for distributing digital contents. The data stream then corresponds to a digital content in one direction of transmission, from the distribution server 40, 41 to the client entities 10, 11, and in the reverse direction, it corresponds to acknowledgments relating to the distribution of the digital content. It is noted that a data stream corresponds to an exchange of packets between two machines of a packet communication network whose packets have common characteristics especially here common characteristics in respect of origin, destination and service. Subsequently, these characteristics are called stream characteristics. An identifier of the data stream is constructed with the aid of these common characteristics. Subsequently, these common characteristics are represented in the form of a quintuple, comprising a source address, a destination address, a source port number, a destination port number and a protocol. No limitation is attached to the way of constructing a stream identifier on the basis of these common characteristics.

The data stream consists of data packets with common characteristics, steered by the packet communication network 1. The client entities 10, 11 are for example computers, connected televisions, mobile terminals, connected directly or else by way of residential gateways, of points of entry to company networks.

The communication sub-network 2 corresponds for example to an access network and comprises a plurality of node apparatuses R1-R5, 20-24, designed to steer the data packets constituting the data streams. A node apparatus 20-24 corresponds for example to a router, to a DSLAM (Digital Subscriber Line Access Multiplexer) apparatus, to a MSAN (Multi-Service Access Node) apparatus in an ADSL (Asymmetric Digital Subscriber Line) technology or FTTH (Fiber To The Home) optical technology, etc.

The client entity 10 accesses the access sub-network 2 by way of the node apparatus 20. The client entity 11 accesses the access sub-network 2 by way of the node apparatus 21. The two node apparatuses 20, 21 are for their part linked to the node apparatus 24 by way successively of the node apparatus 22 and of the node apparatus 23.

In FIG. 1, the processing device 100 is situated in the access network 2 at the output of the apparatus 23, for example on the link joining it to the node apparatus 24. The processing device 100 thus receives the set of packets exchanged between these two node apparatuses 23, 24. The processing device 100 can also be integrated into one of the node apparatuses.

The node apparatus 24 corresponds to a point of interconnection with the second communication sub-network 3. This interconnection point is also known by the name point of presence (POP). The second communication sub-network 3 corresponds to a transit network and comprises node apparatuses R6-R9 30-33. The data packets exchanged between the node apparatus 24 and the distribution server 41 are steered successively by the node apparatuses 30, 32 and 33.

It is stressed here that FIG. 1 is given solely by way of illustration and that no limitation is attached to this simplified representation, especially in terms of number of node apparatuses, organization of the network, etc.

The communication sub-networks are networks implementing the Internet protocol.

The node apparatuses play the role of routers in the network 1, that is to say they are in charge of steering packets in a plane, termed the transfer plane. Subsequently, these node apparatuses are simply called nodes. A route, also called a path, allows steering of packets of a source node destined for a destination node by way of other nodes if appropriate.

When congestion occurs at the level of a node of a route, for example at the level of a queue intended to store the packets output by the node before transmission to the next node on the route, the packets are marked by the node before transmission with the aid of an ECN (Explicit Congestion Notification) information field present in the header of the IP packet. The packets are thus marked by setting the ECN information field to the value "11", thereby corresponding to the "Congestion Experienced" information item. By way of illustrative example, when the node 24 is congested in respect of the steering of the packets received originating from the node 30 and destined for the client entity 10, by way of the nodes 23, 22, 20, these packets are marked on output from the node 24 and the processing device 100 thus receives them marked.

The digital contents are for example distributed with the aid of the TCP (Transport Control Protocol) protocol. A data stream then corresponds to a TCP connection.

The client entities acknowledge, in accordance with the TCP protocol, the data packets received by sending one or more acknowledgments of receipt ACK.

It is stressed here that the communication of the data packets from the distribution server to the client entity can be managed by protocols other than the TCP protocol. By way of example, the UDP/RTP (User Datagram Protocol/Real Time Transport Protocol) protocol can be used, especially for televisual applications of IPTV (Television over IP) type. In this case, the client entities send RTCP (RTP Control Protocol) reports in return and the ECN information item perhaps coded in the header of the data packets which transport these RTCP reports.

In one embodiment, the client entity receiving a marked packet performs the copyover of the ECN information field into the carrier packet bearing the acknowledgment of receipt ACK more precisely into the IP header of the carrier packet bearing the acknowledgment of receipt ACK. Thus if the congestion occurs downstream of the processing device 100, the processing device 100 is notified of this congestion through the receipt of a marked packet sent by the client entity. Such a procedure is described in the patent application published under the number WO2010/046598.

According to the invention, a new state is liable to be associated with a data stream in the processing device 100. When a first packet of a new data stream is received, this new data stream passes into an observation in progress state or "obs" associated with an observation phase in the course of which the packets of the data stream under observation, which are exchanged between the distribution server and the client entity and which follow the first packet, are transmitted by the processing device 100. The new data stream is thus temporarily admitted. During this observation phase, the occurrence of congestion associated with the data stream is monitored. When this congestion is detected, the new data stream passes into a refused state or "ref" associated with a rejection phase, in the course of which subsequent packets of the rejected data stream, which are exchanged between the distribution server and the client entity, are not transmitted. When, on completion of the observation phase, no congestion has been detected, the new data stream is admitted definitively and passes into an accepted state or "acc", in which the subsequent packets of the accepted data stream, which are exchanged between the distribution server and the client entity, are transmitted.

Figures 3, 4:
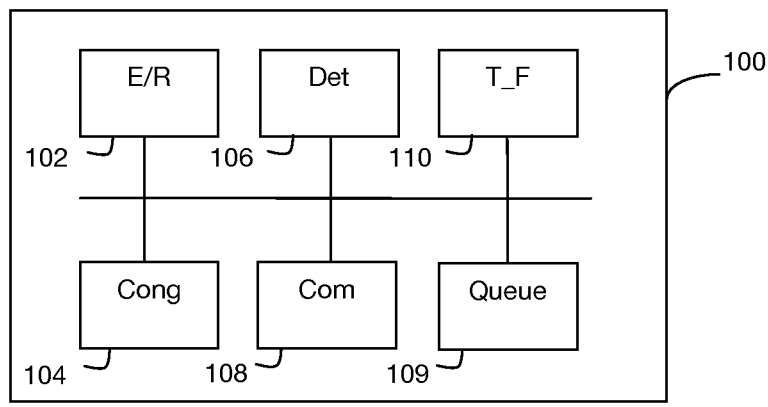
FIG. 3 represents a data stream table in a particular embodiment.
FIG. 4 represents a processing device according to a particular embodiment.

In one embodiment, the processing device 100 stores in a stream table 110, represented in FIG. 3, a state of the stream 112 in association with a stream identifier 111. Also stored in association with the identifier of the stream 111 are, a value 113, denoted $t_p$, representative of the time elapsed since the receipt of the last packet of the stream and for the streams in the observation phase, a value 114 representative of congestion associated with the data stream. By way of illustrative example in conjunction with FIG. 3, four data streams are active:

the stream with identifier F1 is in the accepted state and ten units of time have elapsed since the receipt of the last packet of the stream;
the stream with identifier F2 is in the observation in progress state "obs", a packet has just been received and the value representative of congestion equals three;

the stream with identifier F3 is in the accepted state and a packet has just been received;

the stream with identifier F4 is in the refused state "ref" and fifteen units of time have elapsed since the receipt of the last packet of the stream.

An admission control in respect of a new session is thus performed by temporarily admitting the new stream and by observing the effect of this admission in the packet communication network 1. Thus it is not necessary to implement a signaling protocol to reserve resources, nor to resort to a partitioning of the resources of the network. Moreover, the temporary admission of the new data stream during the observation phase makes it possible to observe the effect of the admission thereof at the level of the apparatuses of the network. If its temporary admission gives rise to congestion at the level at least of an apparatus on the route between the distribution server and the client entity, it is preferable to reject the new data stream so as to avoid degrading the quality of service of the already admitted data streams.

Figure 2A:
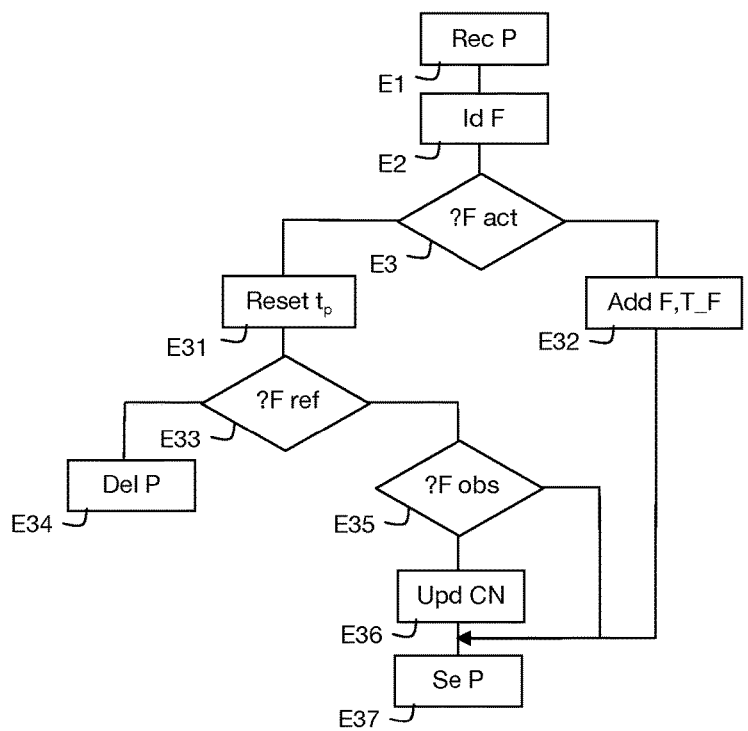
FIGS. 2a, 2b and 2c represent steps of the processing method according to a particular embodiment.
Figure 2B:
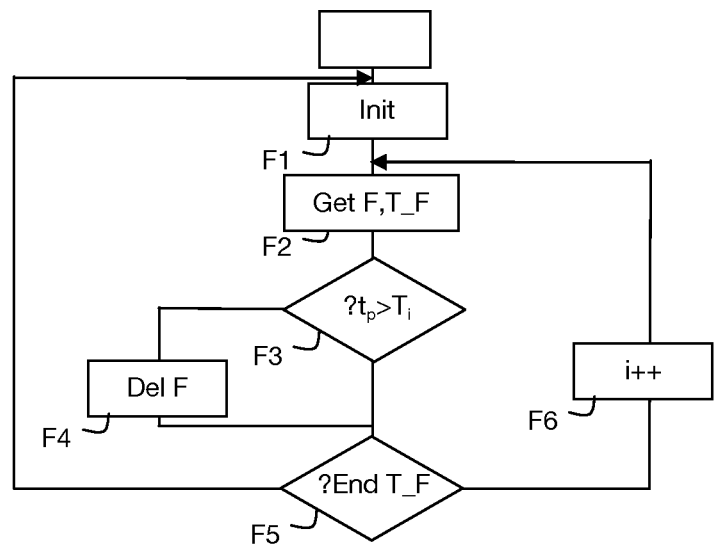
Figure 2C:
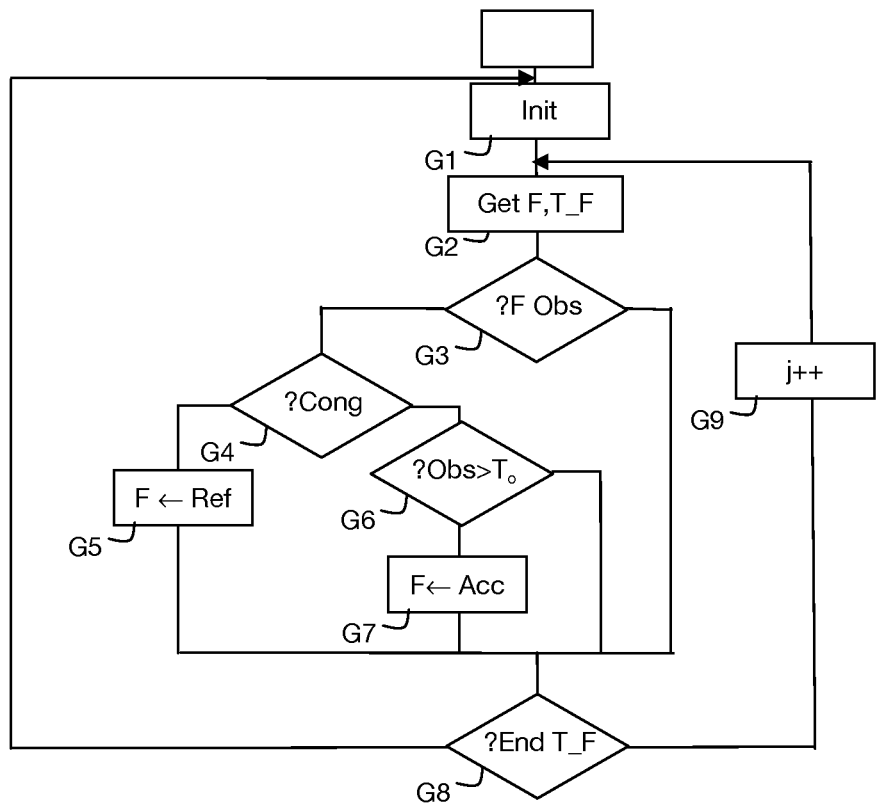

FIGS. 2a, 2b and 2c represent in a schematic manner steps of the method for processing a data stream in a particular embodiment.

FIG. 2a represents steps of the processing method implemented by the processing device 100 upon receipt of a data packet.

In a reception step E1, the processing device 100 receives the data packet and stores it in a queue with a view to its transmission.

In a step E2, the processing device 100 determines on the basis of the data packet an identifier of the data stream to which the packet belongs. In a particular embodiment, the identifier of the stream is determined by applying a hash function to the quintuple forming the common characteristics of the data stream. This makes it possible to speed up access to the records of the stream table 110.

In a step E3, the processing device 100 verifies whether the data stream identified is a new stream. More precisely, the processing device 100 consults the stream table 110 so as to verify whether the identified data stream is already active, that is to say whether a record associated with the identifier of the stream is stored therein. If such a record exists, the identified data stream is not a new data stream. If such a record does not exist, the data packet received is the first packet of the new identified data stream.

If the identified data stream is not new, that is to say if data packets belonging to the identified data stream have already been received, in a step E31, the processing device 100 resets to zero the value 113 representative of the time elapsed $t_p$ since the receipt of a packet of the identified data stream and stores it in the stream table 110.

In a step E33, the processing device 100 verifies whether the identified data stream is a refused stream, that is to say whether its state is "ref". More precisely, the processing device 100 consults the stream table 110 so as to obtain the state associated with the identifier of the stream.

If the data stream is in a refused state or "ref", that is to say a phase of rejecting the packets is in progress, in a step E34, the data packet is deleted from the queue and is not transmitted.

If the data stream is not in the refused state, in a step E35, the processing device 100 verifies whether the data stream is in an observation in progress state "obs". If such is the case, in a step E36, the processing device 100 obtains on the basis of the data packet received an information item relating to congestion. It is recalled here that this congestion may have occurred upstream of the processing device 100 for a packet originating from the distribution server or else downstream of the processing device 100, in which case the congestion information item is carried by a packet comprising an acknowledgment transmitted by the client entity 10. Still in this step E36, the processing device 100 updates a counter CN representative of congestion associated with the identified data stream.

By way of nonlimiting example, the counter CN directly counts up the number of received packets carrying an information item representative of congestion. Still by way of nonlimiting example, the counter CN is increased by one on receipt of an information item relating to congestion and decremented by a predetermined value less than one when the packet received does not carry any information item relating to congestion. It is also possible to take into account in the counter CN the age of the information item representative of congestion. No limitation is attached to the procedure used to determine this counter CN.

Next, in a transmission step E37, the processing device 100 transmits the data packet received to its destination.

Returning to step E35, if the state of the data stream is not observation in progress, this data stream has been previously admitted, its state being accepted "acc". In this case, the processing device 100 directly implements the transmission step E37 described above.

This terminates the description of the steps implemented when the data stream is already active.

Returning to step E3, if the processing device 100 has detected that the identified data stream is a new stream, that is to say the data packet received belongs to an inactive data stream, this data packet then being a first packet of the identified data stream, in a step E32, the processing device 100 initializes the congestion counter CN and stores in the stream table 110 an observation in progress state "obs" and the congestion counter CN in association with the identifier of the data stream. This triggers a phase of observing the data stream on receipt of a first packet of the stream. Step E37 of transmitting the data packet is then implemented. Thus, in the course of this observation phase, the packets of the data stream which are exchanged between the server and the client entity and which follow the first packet are transmitted.

The processing of the data packet received is then terminated. It is recalled here that in the observation phase, the packets received are transmitted and that in the rejection phase, following detection of congestion associated with the data stream during an observation phase, the packets received are not transmitted, that is to say destroyed.

FIG. 2b describes steps of the processing method which are implemented by the processing device 100 in a regular manner, for example cyclically. These steps make it possible to delete the inactive data streams from the table of streams 110. A cycle corresponds for example to a predetermined duration.

In a step F1, the processing device 100 initializes a running variable i for traversing the table of streams 110 to the value one.

In a step F2, the processing device 100 obtains the record indexed by the running variable of the table of streams i.

In a step F3, the processing device 100 verifies whether the value $t_p$ of the elapsed time since the receipt of the last packet is greater than a threshold value $T_i$. If such is the case, that is to say if the data stream is considered to be inactive, in a step F4, the processing device 100 deletes the record of this inactive data stream from the table of streams 110.

In both cases, the processing device 100 thereafter verifies in a step F5 whether the value i corresponds to the last record of the stream table 110.

If such is not the case, the processing device 100 increments the running value i of the table by one in a step F6 and implements step F2 again.

In the converse case, the whole set of records stored in the table of streams 110 has been processed and the cycle is terminated. The inactive data streams have been deleted from the stream table 110.

FIG. 2c describes steps of the processing method that are implemented by the processing device 100 in a regular manner, for example cyclically. These steps relate to the management of the state of the streams.

In a step G1, the processing device 100 initializes a running variable j for traversing the table of streams 110 to the value one.

In a step G2, the processing device 100 obtains the record indexed by the running variable j of the table of streams.

In a step G3, the processing device 100 verifies whether the state of the stream stored in the record obtained takes the value "obs", that is to say whether observation of the data stream is in progress.

If such is the case, that is to say if observation of the data stream is in progress, in a step G4, the processing device 100 verifies whether a congestion is associated with the data stream. More precisely in this embodiment, the processing device 100 verifies whether the counter CN associated with the data stream is greater than a threshold congestion value. It is for example possible to choose this threshold at the value one, in which case the state of the data stream is modified from "observation in progress" to "rejected" as soon as a data packet of the stream carrying an information item representative of congestion is received. Other values can also be chosen as a function of the procedure used to determine the counter CN.

When a congestion associated with the data stream is detected, in a step G5, the processing device 100 modifies the state of the data stream to the "refused" state and stores in the table of streams 110 this new state in association with the identifier of the stream. The modification from the state "observation in progress" to "refused" thus triggers a phase of rejecting the data stream on detection of congestion associated with the data stream. In the course of this rejection phase, packets of the data stream which are exchanged between the server and the client entity and are received after detection of the congestion are not transmitted.

When no congestion associated with the data stream has been detected, in a step G6, the processing device 100 verifies whether the duration of the observation phase is greater than a predetermined duration $T_o$. In this case, in step G7, the processing device 100 modifies the state of the identified data stream from "observation in progress" to "accepted" and stores this state in the stream table 110 in association with the identifier of the stream.

In all cases, the processing method thereafter passes to the implementation of a step G8, described subsequently.

When the duration of the observation phase is less than the predetermined duration $T_o$, the observation phase continues and no action on the state of the stream is performed. The processing method thereafter passes to step G8.

When in step G3, the processing device 100 has detected that the state of the stream stored in the record obtained does not take the value "obs", the processing method passes directly to step G8.

In step G8, the processing device 100 verifies whether the value j corresponds to the last record of the stream table 110.

If such is not the case, the processing device 100 increments the running value j of the table by one in a step G9 and implements step G2 again.

In the converse case, the whole set of records stored in the table of streams 110 has been processed and the cycle is terminated.

In the embodiment such as described, the inactivity of a data stream is determined by the absence of receipt of packets for a predetermined duration $T_i$. No limitation is attached to the inactivity detection procedure. It is also possible to take into account a control message traveling through the processing device and indicating the end of the data stream so as to detect the inactivity of the data stream.

In the embodiment such as described, the observation phase is limited by a maximum duration $T_o$. In another embodiment, the observation phase may also be limited as a function of the number of packets of the data stream under observation transmitted.

In the embodiment such as described, a data stream can take four states: inactive, accepted, observation in progress, refused. It is possible to adapt the processing method as a function of more complex state machines, for example comprising a larger number of possible states. By way of illustrative example, in a variant of the algorithm, after detection of congestion associated with the data stream, the data stream remains in the observation phase and the congestion indicators are counted up until the end of the observation period. A reject or admit decision is taken as a function of the persistence or otherwise of the congestion. For this variant, sub-states are introduced during the observation phase, so as to reflect the various sub-steps.

In the embodiment described above, the processing device 100 takes into account solely congestion associated with the data stream under observation. In a variant to this embodiment, the processing device 100 also takes into account congestion associated with another data stream. This other data stream has been previously admitted temporarily or definitively by the processing device 100 and is active. By way of illustrative example this other data stream is established between the distribution server 41 and the client entity 11. Congestion associated with this other data stream is detected. The processing device 100 identifies, for example by virtue of the IP address of the client entity 11, an area where the congestion occurs. As a function of this identified area, the processing device 100 can thus take into account the congestion associated with this other data stream so as to decide to admit or otherwise the data stream, especially if the identified area is common to the two data streams.

In another particular embodiment, various service classes are defined. In this case, the congestion information carried by a packet of a data stream indicates congestion in respect of the steering of the packets whose service class corresponds to that of the data stream and also the packets whose service class is of lower priority. Thus, for service classes defined from one to four, where the service class one corresponds to the greatest priority, when the service class four of low priority encounters congestion, this does not trigger the introduction of an ECN congestion information item for packets of higher priority service classes, for example from one to three.

It is then possible to implement the processing method such as described above for a data stream whose service class is low. Still by way of illustrative example, it is then possible to implement the processing method such as described above for the data streams, of service class three or four. Thus, the priority streams are always admitted by this processing method; the lower priority streams are liable to be rejected in the case of congestion. It is stressed here that it is also possible to implement the processing method such as described above for the priority service classes when the traffic volume exceeds a predetermined threshold.

Moreover, it is also stressed that the processing method such as described above can be combined with the method of controlling the opening of sessions such as is described in the patent application published under the number WO2011/001096.

The foregoing examples are merely possible modes of implementation of the invention which is not limited thereto. In particular, networks other than those of the TCP/IP protocol may be concerned, such as the networks of ATM type. Likewise, other congestion notification mechanisms may be used, such as Forward Explicit Congestion Notification mechanism FECN, a Backward Explicit Congestion Notification mechanism BECN, or else combinations of these various mechanisms. The term "forward" corresponds to the direction of transmission of a packet, that is to say toward the recipient of the packet, and the term "backward" corresponds to the opposite direction of transmission of the packet, that is to say toward the sender of the packet. These various mechanisms use a field of the header of the data packets to carry an information item relating to the congestion of one of the nodes steering the packet.

In FIG. 1, the processing device 100 is represented at the output of the node apparatus R5 24. This makes it possible to implement the processing method for the whole set of data streams, that is to say the data streams transmitted by the distribution server 40, implemented by the operator, as well as those transmitted by the distribution server 41, providing the service for a third party operator. No limitation is attached to the location of this processing device, nor to the number of such devices. It is for example possible to place a processing device 100 at the output of the node apparatus R9 33, if it is desired to apply the admission control to the data streams having the distribution server 41 as source. If it is desired to limit the size of the table of streams 110, it is also possible to position a processing device 100 in the access network 2 as close as possible to the client entities.

We shall now describe a processing device 100 in conjunction with FIG. 4.

Such a device 100 comprises:
  a send/receive module 102, designed to receive and send packets in the packet communication network;
  a module for detecting congestion 104, designed to detect congestion associated with a data stream;
  an identification module 106, designed to detect a first packet of a data stream and to trigger the module for detecting congestion 104;
  a control module 108, designed to inhibit the transmission of the subsequent packets of said data stream, on detection of congestion associated with this data stream by the means for detecting congestion 104.

The processing device 100 furthermore comprises the stream table 110 already described and a memory area 109 or queue, designed to store a packet received by the send/receive module 102 before transmission.

The control module 108 is then designed to delete the packet received from the queue 109, this deletion inhibiting the transmission of the packet. The control module 108 is also designed to delete the inactive streams from the table of streams 110, that is to say the data streams for which no packet has been received for a duration greater than the predetermined threshold $T_p$. The control module 108 is also designed to associate a state with a data stream and to store it in association with an identifier of the stream in the table of streams 110.

The module for detecting congestion 104 is moreover designed to update the counter CN representative of congestion associated with a data stream, on the basis of a congestion information item carried by a received packet, and to detect the congestion associated with the data stream on the basis of the counter CN.

The modules 104, 106, 108 are designed to implement the method described above. These preferably entail software modules comprising software instructions for executing the steps of the method described above, implemented by a processing device 100. The invention therefore also relates to:
  a program for such a device, comprising program code instructions intended to control the execution of the steps of the method described above, when said program is executed by said device;
  a recording medium readable by a device on which the program for such a device is recorded.

The software modules can be stored in or transmitted by a data medium. The latter may be a hardware storage medium, for example a CD-ROM, a magnetic diskette or a hard disk, or else a transmission medium such as an electrical, optical or radio signal, or a telecommunication network.

The processing device 100 can be an independent device such as a collector or else integrated into a node apparatus, such as the node R5.

Although the present disclosure has been described with reference to one or more examples, workers skilled in the art will recognize that changes may be made in form and detail without departing from the scope of the disclosure and/or the appended claims.

The invention claimed is:

1. A method for processing data streams between at least one server and at least one client entity in a packet communication network, the data streams being composed of packets steered by a processing device, distinct from said at least one server and said at least one client entity, said method comprising the following acts performed by the processing device:
  associating each data stream processed by the processing device with a state selected among a plurality of states comprising at least an accepted state and an observation state;
  receiving a packet of a data stream from the packet communication network, which was transmitted by one of the at least one server and at least one client entity;
  determining an identity of the data stream of the received packet;
  determining from the identity whether the packet is a new data stream to be processed by the processing device or a previously processed data stream;
  if the data stream of the received packet is a new data stream, associating the new data stream with the observation state and:
    entering an observation phase by temporarily admitting said new data stream and observing the new data stream by the processing device, in the course of which packets of the new data stream that are exchanged between the at least one server and the at least one client entity and that follow the received packet are transmitted further by the processing device on the packet communication network;

entering a phase of interrupting said new data stream by the processing device, triggered on detecting by the processing device, on the basis of at least one data packet of said data streams received by the processing device from one of said at least one server and at least one client entity during the observation phase, a congestion associated with said new data stream, in which packets of the new data stream received from the network by the processing device after detection of the congestion are not transmitted further by the processing device; and definitively admitting the new data stream on completion of the observation phase if no congestion associated with said new data stream is detected, and changing the association of the new data stream from the observation state to the accepted state; and if the data stream of the received packet is a previously processed data stream and is associated with the accepted state, transmitting the received packet further on the packet communication network by the processing device.

2. The processing method as claimed in claim 1, in which the congestion associated with said second data stream is detected by receipt of at least one congestion information item transported in one of the packets of the new data stream that are received in the observation phase.

3. The processing method as claimed in claim 1, in which the phase of interrupting is also triggered on detection in the course of the observation phase of congestion associated with a different data stream than the new data stream and processed by the processing device.

4. The processing method as claimed in claim 2, in which the packet in which the congestion information item is transported is received from the server and destined for the client entity.

5. The processing method as claimed in claim 2, in which the packet in which the congestion information item is transported is an acknowledgment packet sent by the client entity destined for the server.

6. The processing method as claimed in claim 1, in which the observation phase is implemented for data streams of service class lower than a predetermined value.

7. An apparatus comprising:
a processing device for processing data streams between at least one server and at least one client entity in a packet communication network, the data streams being composed of packets, comprising:
a non-transitory computer-readable medium comprising instructions stored thereon;
a processor configured by the instructions to perform acts comprising:
associating each data stream processed by the processing device with a state selected among a plurality of states comprising at least an accepted state and an observation state;
receiving a packet of a data stream from the packet communication network, which was transmitted by one of the at least one server and at least one client entity;
determining an identity of the data stream of the received packet;
determining from the identity whether the packet is a new data stream to be processed by the processing device or a previously processed data stream;
if the data stream of the received packet is a new data stream, associating the new data stream with the observation state and:
entering an observation phase by temporarily admitting said new data stream and observing the new data stream by the processing device, in the course of which packets of the new data stream that are exchanged between the at least one server and the at least one client entity and that follow the received packet are transmitted further by the processing device on the packet communication network;
entering a phase of interrupting said new data stream by the processing device, triggered on detecting by the processing device, on the basis of at least one data packet of said data streams received by the processing device from one of said at least one server and at least one client entity during the observation phase, a congestion associated with said new data stream, in which packets of the new data stream received from the network by the processing device after detection of the congestion are not transmitted further by the processing device; and
definitively admitting the new data stream on completion of the observation phase if no congestion associated with said new data stream is detected, and changing the association of the new data stream from the observation state to the accepted state; and
if the data stream of the received packet is a previously processed data stream and is associated with the accepted state, transmitting the received packet further on the packet communication network by the processing device.

8. The apparatus of claim 7, wherein the apparatus is a node apparatus, which comprises the processing device, wherein the node apparatus is configured to steer packets exchanged between the server and the client entity.

9. A non-transitory computer-readable hardware storage medium comprising a program stored thereon and comprising program code instructions to control execution of a method for processing data streams between at least one server and at least one client entity in a packet communication network, the data streams being composed of packets steered by a processing device, when said program is executed by said processing device, wherein the method comprises the following acts performed by the processing device:
associating each data stream processed by the processing device with a state selected among a plurality of states comprising at least an accepted state and an observation state;
receiving a packet of a data stream from the packet communication network, which was transmitted by one of the at least one server and at least one client entity;
determining an identity of the data stream of the received packet;
determining from the identity whether the packet is a new data stream to be processed by the processing device or a previously processed data stream;
if the data stream of the received packet is a new data stream, associating the new data stream with the observation state and:
entering an observation phase by temporarily admitting said new data stream and observing the new data stream by the processing device, in the course of which packets of the new data stream that are exchanged between the at least one server and the at least one client entity and that follow the received packet are transmitted further by the processing device on the packet communication network;

entering a phase of interrupting said new data stream by the processing device, triggered on detecting by the processing device, on the basis of at least one data packet of said data streams received by the processing device from one of said at least one server and at least one client entity during the observation phase, a congestion associated with said new data stream, in which packets of the new data stream received from the network by the processing device after detection of the congestion are not transmitted further by the processing device; and definitively admitting the new data stream on completion of the observation phase if no congestion associated with said new data stream is detected, and changing the association of the new data stream from the observation state to the accepted state; and if the data stream of the received packet is a previously processed data stream and is associated with the accepted state, transmitting the received packet further on the packet communication network by the processing device.

* * * * *